(12) United States Patent
Snelten et al.

(10) Patent No.: US 8,836,225 B2
(45) Date of Patent: Sep. 16, 2014

(54) DIMMING OF LED DRIVER

(75) Inventors: Jeroen Snelten, Liempde (NL); Geert Willem Van Der Veen, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 171 days.

(21) Appl. No.: 13/497,533

(22) PCT Filed: Sep. 21, 2010

(86) PCT No.: PCT/IB2010/054250
§ 371 (c)(1),
(2), (4) Date: Mar. 22, 2012

(87) PCT Pub. No.: WO2011/039678
PCT Pub. Date: Apr. 7, 2011

(65) Prior Publication Data
US 2012/0181940 A1    Jul. 19, 2012

(30) Foreign Application Priority Data
Sep. 30, 2009   (EP) ..................... 09171813

(51) Int. Cl.
*H05B 37/02* (2006.01)
*H05B 33/08* (2006.01)

(52) U.S. Cl.
CPC .......... *H05B 33/0815* (2013.01); *Y02B 20/346* (2013.01); *Y02B 20/348* (2013.01); *H05B 33/0818* (2013.01)
USPC ........ 315/186; 315/209 R; 315/224; 315/226; 315/291; 315/308

(58) Field of Classification Search
USPC ............ 315/186, 201, 209 R, 224, 226, 291, 315/307, 308
See application file for complete search history.

(56) References Cited

U.S. PATENT DOCUMENTS

| | | | |
|---|---|---|---|
| 2003/0043611 A1* | 3/2003 | Bockle et al. | 363/131 |
| 2003/0122502 A1* | 7/2003 | Clauberg et al. | 315/291 |
| 2008/0297058 A1 | 12/2008 | Soos | |
| 2010/0052566 A1* | 3/2010 | Kitamura et al. | 315/291 |

FOREIGN PATENT DOCUMENTS

| | | |
|---|---|---|
| CN | 1757267 A | 4/2006 |
| CN | 101347046 A | 1/2009 |
| EP | 1672706 A1 | 6/2006 |
| EP | 1791399 A1 | 5/2007 |
| JP | 8228026 A | 9/1996 |
| JP | 200954425 A | 3/2009 |

(Continued)

*Primary Examiner* — Douglas W Owens
*Assistant Examiner* — Thai Pham
(74) *Attorney, Agent, or Firm* — Yuliya Mathis

(57) ABSTRACT

A dimmable LED driver circuit comprises a resonant DC-DC converter coupled to an output circuit. The converter comprises a half bridge or full bridge switching circuit coupled to a resonant circuit. An output of the resonant circuit is rectified and fed to the output circuit. The output circuit may comprise at least one LED series or shunt switch for switching an LED unit on and off. A control circuit controls the switches of the switching circuit at a variable switching frequency. The control circuit is also configured for controlling the switching circuit for amplitude modulating the converter and for pulse-width modulating the converter at a first pulse-width modulation frequency lower than the switching frequency. The control circuit is may further be configured for controlling the switching of the LED switch at a second pulse-width modulation frequency lower than the switching frequency.

20 Claims, 6 Drawing Sheets

(56) References Cited

FOREIGN PATENT DOCUMENTS

| | | | |
|---|---|---|---|
| JP | 2009152130 | A | 7/2009 |
| JP | 2009529312 | A | 8/2009 |
| WO | 03056878 | A1 | 7/2003 |
| WO | 2008152565 | A2 | 12/2008 |

* cited by examiner

DIMMING OF LED DRIVER

FIELD OF THE INVENTION

The invention relates to the field of light emitting diode, LED, drivers, and more specifically to dimming of LED drivers to achieve very low dimming levels.

BACKGROUND OF THE INVENTION

LEDs are increasingly used for various illumination applications. Many of such application require an LED driver to be dimmable to vary the amount of light produced by the LED or LEDs. Further, in a combination of LEDs producing light of different colors, where the different colors are mixed to obtain light with a specific color temperature, an LED driver for LEDs of one color or several colors also needs to be dimmable.

Existing converters used for dimmable LED driver purposes are mainly hard switching converters. Use of hard switching converters has disadvantages in that they do not have a high efficiency, and in that they generate a relative high level of electromagnetic interference, EMI.

A relatively low efficiency of the hard switching converter leads to increased power dissipation at the commonly used high converter frequencies. As a result, cooling of some converter power components becomes a major problem, which restricts a desired miniaturization of the converter.

Generating a relative high level of EMI means that relative large area has to be reserved for mains filtering, which further restricts miniaturization of the converter.

LED drivers are commonly dimmed using pulse width modulation, PWM, which e.g. is disclosed in reference U.S. Pat. No. 6,510,995 using a resonant converter. For very small duty cycles in PWM operation, PWM controlled converters cannot provide a desired stability of the duty cycle. An unstability of the duty cycle may result in flickering, which is undesirable.

SUMMARY OF THE INVENTION

It would be desirable to provide an LED driver circuit which provides for stable deep dimming of an LED unit.

To better address one or more of these concerns, in a first aspect of the invention a dimmable LED driver circuit is provided, comprising:

a resonant DC-DC converter comprising a switching circuit having at least a first converter switch and a second converter switch, and coupled to a resonant circuit, and a rectifier circuit coupled to the resonant circuit;

an output circuit coupled to the rectifier circuit, the output circuit comprising LED output terminals arranged to be coupled to an LED unit; and a control circuit configured for switching the converter switches at a variable switching frequency, the control circuit further being configured for controlling the switching circuit for amplitude modulating the converter and for pulse-width modulating the converter at a first pulse-width modulation frequency lower than the switching frequency.

In a second aspect of the invention a method of controlling a dimmable LED driver circuit is provided, the method comprising:

providing a resonant DC-DC converter comprising a switching circuit having at least a first converter switch and a second converter switch, and coupled to a resonant circuit, and a rectifier circuit coupled to the resonant circuit;

providing an output circuit coupled to the rectifier circuit, the output circuit comprising LED output terminals arranged to be coupled to an LED unit;

switching the converter switches at a variable switching frequency; and controlling the switching circuit for amplitude modulating the converter and for pulse-width modulating the converter at a first pulse-width modulation frequency lower than the switching frequency.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
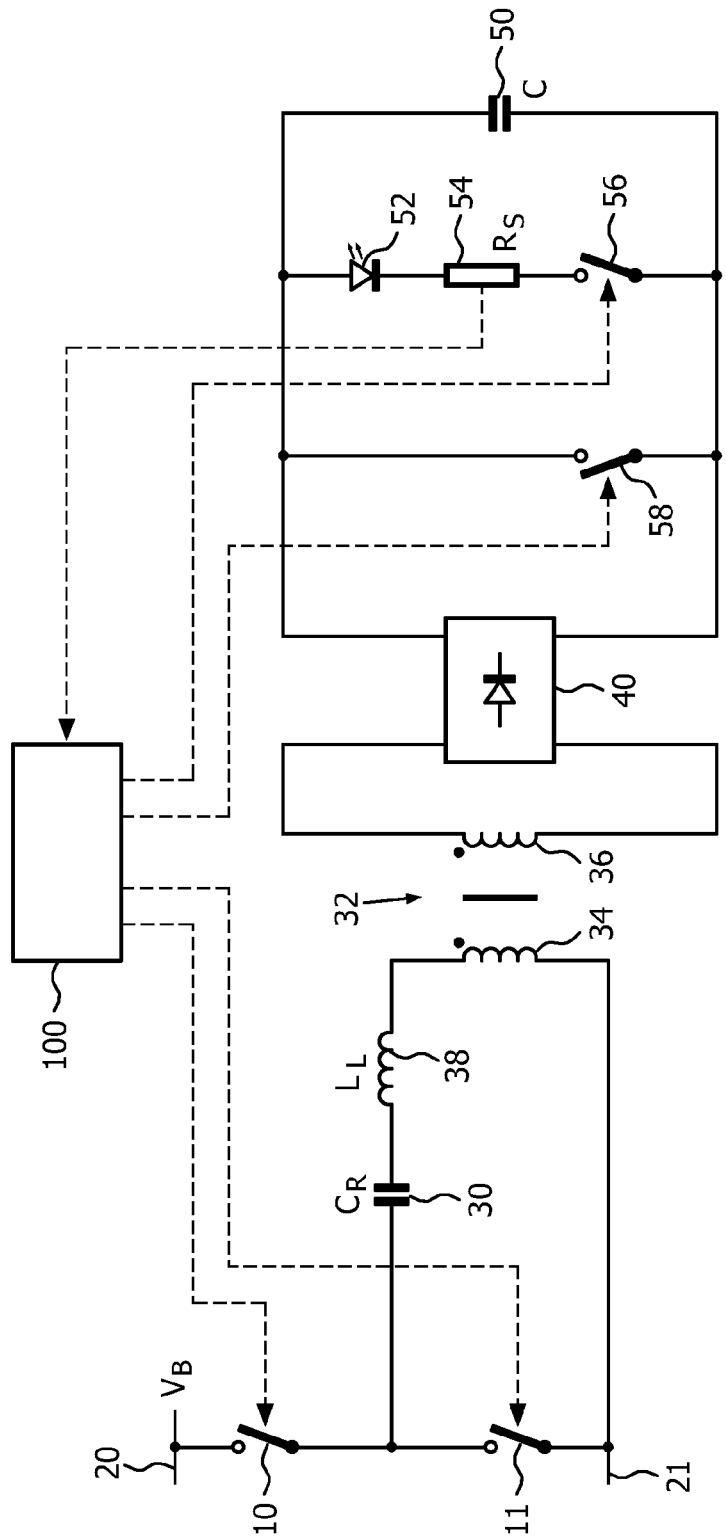
FIG. 1 depicts a schematic circuit diagram of an embodiment of an LED driver circuit according to the present invention, coupled to an LED unit.

FIGS. 1, 2, 3 and 4 depict an LED driver circuit comprising a resonant DC-DC converter. The resonant DC-DC converter comprises a switching circuit coupled to a resonant circuit, and a rectifier circuit coupled to the resonant circuit.

As depicted in FIGS. 1, 2, 3 and 4, the switching circuit of the LED driver circuit comprises a switching circuit, in the embodiment shown a half bridge switching circuit having converter switches 10, 11 coupled in series between input voltage terminals 20, 21 which are configured to receive a DC input voltage $V_B$. Each of the switches 10, 11 may be any suitable kind of electronic switch, e.g. a metal oxide semiconductor field effect transistor, MOSFET, switch. The DC input voltage may be generated by rectification of an AC mains voltage with a rectifier circuit, which may be supplemented with a power factor correction, PFC, circuit. In the art, rectifier circuits as well as PFC circuits are well known in various embodiments, and consequently such circuits are not explained in detail here.

A resonant circuit of the LED driver circuit comprises a resonant capacitor, $C_R$, 30 and a primary winding 34 of a transformer 32 connected in series between a common node of the switches 10, 11 and input voltage terminal 21. The transformer has a secondary winding 36. An inductor 38 may be included in the resonant circuit in series with the primary winding 34 of the transformer 32, or the transformer 32 as depicted may be considered a perfect transformer with inductor 38 representing a leakage inductance, $L_L$, of the transformer 32 used in practice. The secondary winding 36 of the transformer 32 is coupled to an input of a rectifier circuit 40 of the LED driver circuit.

In FIG. 1, an output of the rectifier circuit 40 is coupled to an output circuit. The output circuit comprises output capacitor, C, 50, which is coupled in parallel to a series arrangement of an LED unit 52 comprising at least one LED element generating light of one color or a number of LED elements generating light of different colors, a sense resistor, $R_S$, 54, and an LED series switch 56. Instead of an LED series switch 56, the converter circuit may comprise a shunt switch 58 coupled in parallel to the output of the rectifier circuit 40.

Figure 2:
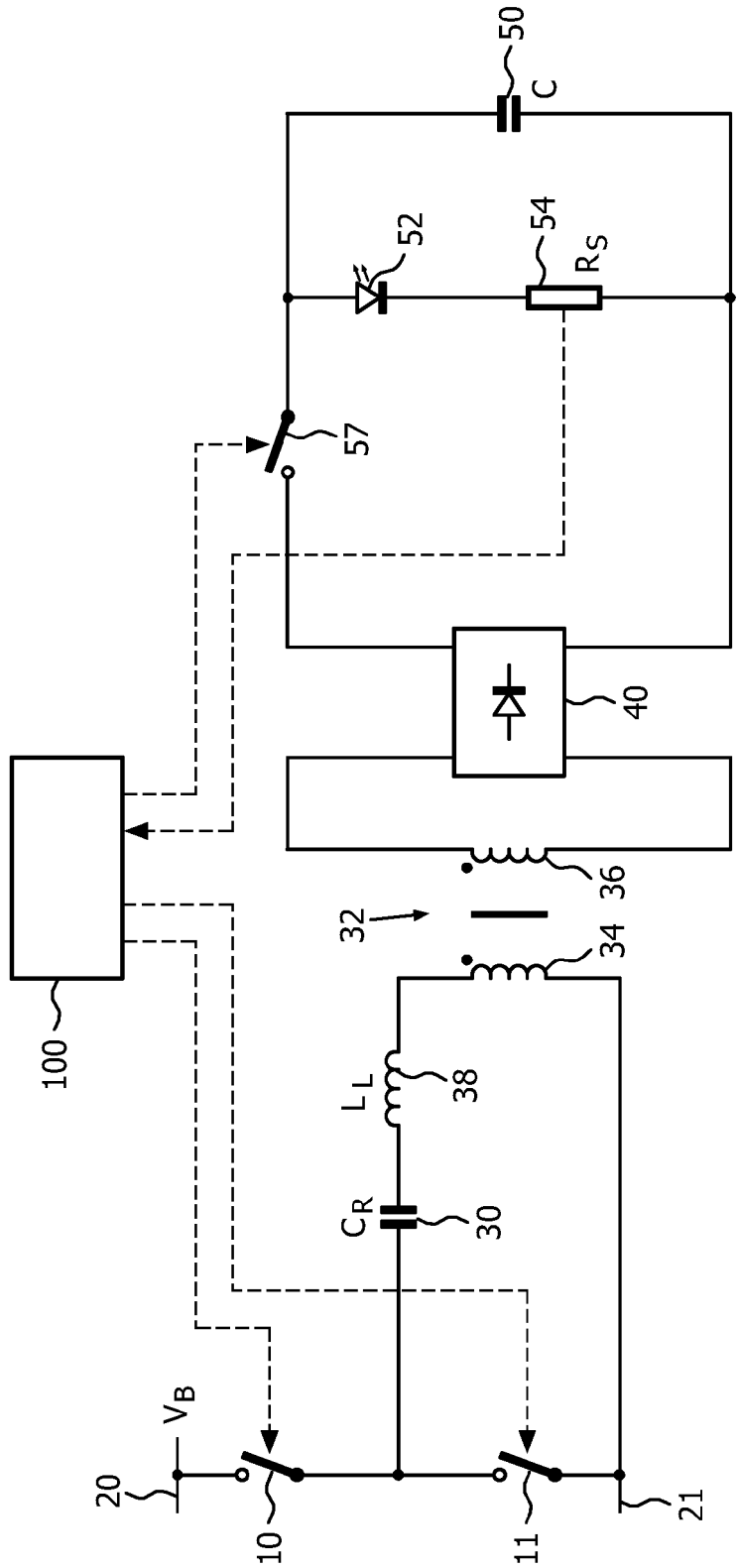
FIG. 2 depicts a schematic circuit diagram of another embodiment of an LED driver circuit according to the present invention, coupled to an LED unit.

In FIG. 2, the output of the rectifier circuit 40 is coupled to an output circuit. The output circuit comprises capacitor, C, 50, which is coupled in parallel to a series arrangement of an LED unit 52 comprising at least one LED element generating light of one color or a number of LED elements generating light of different colors, and a sense resistor, $R_S$, 54. An LED series switch 57 is coupled in series with the parallel arrangement of the output capacitor 50, and the series arrangement of the LED unit 52 and the sense resistor 54.

Figure 3:
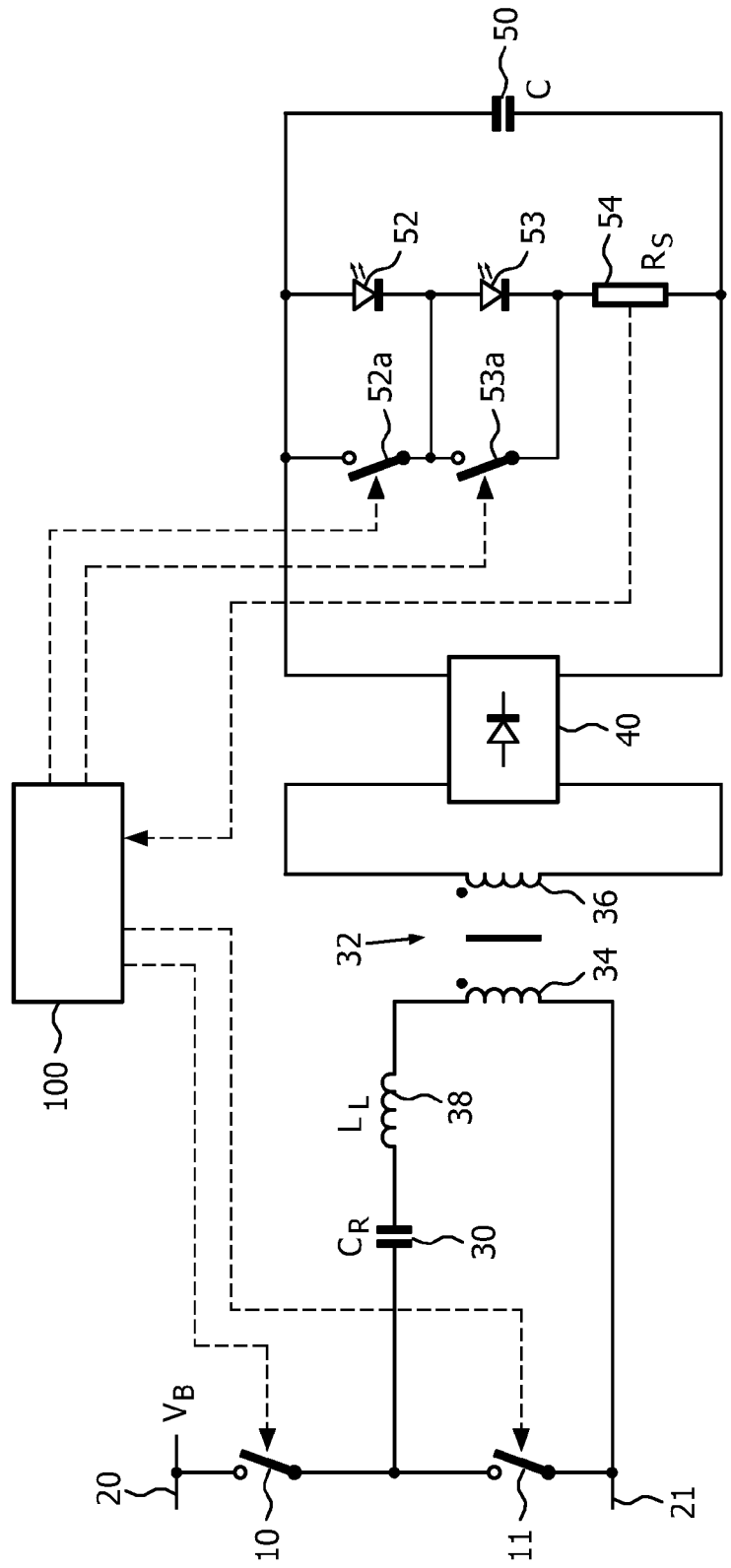
FIG. 3 depicts a schematic circuit diagram of still another embodiment of an LED driver circuit according to the present invention, coupled to LED units.

In FIG. 3, the output of the rectifier circuit 40 is coupled to an output circuit. The output circuit comprises an output capacitor, C, 50, which is coupled in parallel to a series arrangement of an LED unit 52 comprising at least one LED element, an LED unit 53 comprising at least one LED element, one or more possible further LED units, and a sense resistor, $R_S$, 54. Each LED unit 52, 53, . . . generates light of the same or a different color, e.g. red, green, blue, or white. The LED units 52, 53, . . . each have an LED shunt switch 52a, 53a, . . . , respectively. A further LED unit in the series arrangement of LED units may not be provided with an LED shunt switch.

Figure 4:
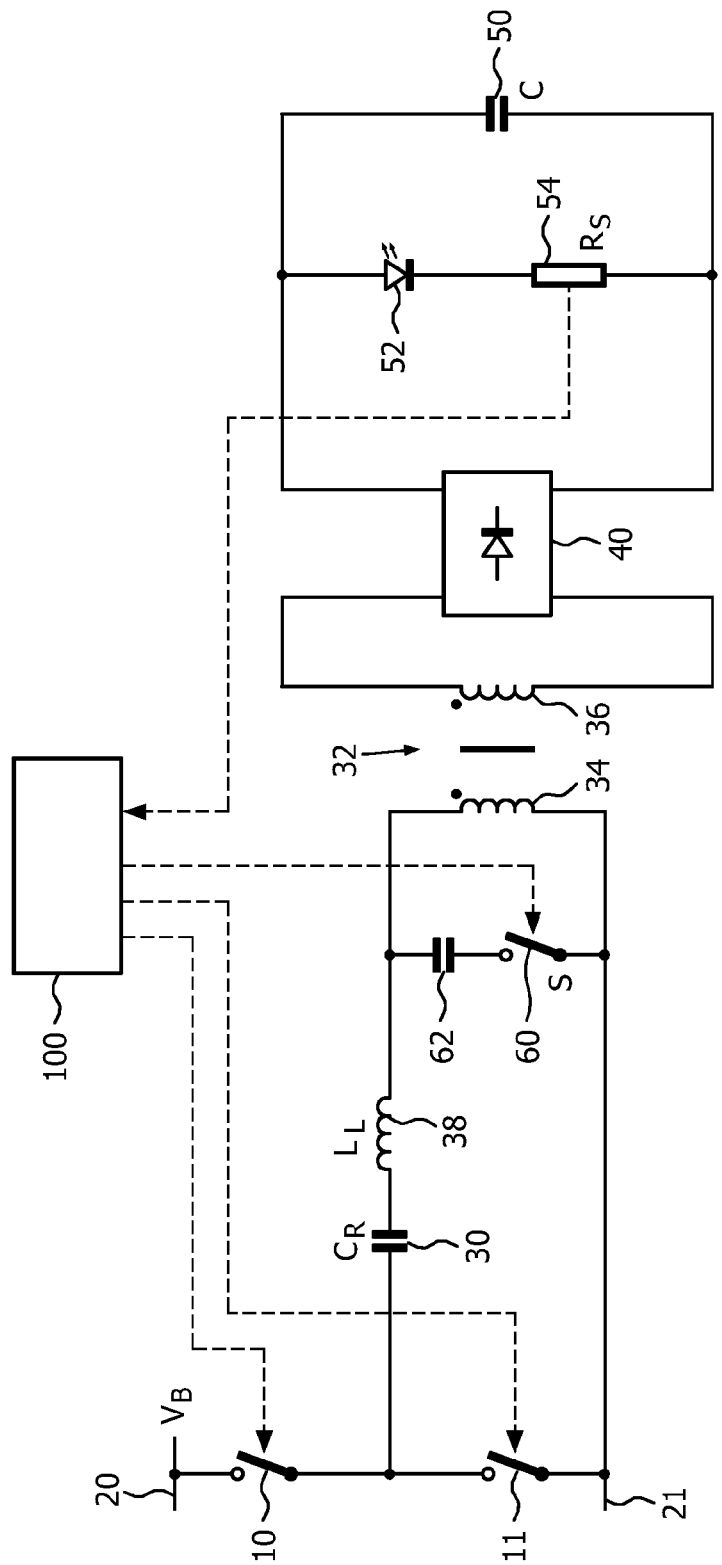
FIG. 4 depicts a schematic circuit diagram of yet another embodiment of an LED driver circuit according to the present invention, coupled to an LED unit.

In FIG. 4, the output of the rectifier circuit 40 is coupled to an output circuit. The output circuit comprises an output capacitor, C, 50, which is coupled in parallel to a series arrangement of an LED unit 52 comprising at least one LED element generating light of one color or a number of LED elements generating light of the same or different colors, and a sense resistor, $R_S$, 54.

In FIGS. 1, 2, 3 and 4, the LED unit(s) do not form part of the LED driver circuit. The LED unit(s) are coupled between LED output terminals of the LED driver circuit. A combination of the LED driver circuit and the LED unit(s) forms a lighting unit.

The LED driver circuit further comprises a control circuit 100 for controlling the switching of the converter switches 10, 11, the LED series switch 56 or 57 (if present), the LED shunt switch 58 (if present), and for sensing a voltage/current across/through the sense resistor 54. The dashed lines in the FIGS. 1, 2, 3 and 4 between the control circuit 100 and the different switches may e.g. represent gate drive circuits for switching the switches, where the control circuit 100 comprises circuitry to generate timed and synchronized gate drive pulses. The dashed line between the sense resistor 54 and the control circuit 100 may e.g. represent a signal line for a voltage or current signal to be used in a feedback control of the generation of the gate drive pulses.

In the following, when a switch is open, it may also be referred to as non-conductive or non-conducting. On the other hand, when a switch is closed, it may also be referred to as conductive or conducting. Various dimming possibilities of the LED driver circuit according to the present invention are described.

First, the present invention provides for amplitude modulation, AM, to obtain a desired output voltage, an output current, or an output power of the LED driver circuit by changing the switching frequency of the converter switches 10, 11. Due to the resonance behavior of the converter, a frequency variation results in a variation of an output parameter, i.e. output voltage, output current or output power. In an application, a change of output voltage may be used to compensate a forward voltage variation of the LEDs. The required frequency variation to compensate for LED forward voltage variation is relatively low. Similar frequency variations may be used to compensate for converter tolerances.

Dimming a resonant converter to low current levels is not always possible due to imperfections of a converter such as output capacitances of the windings of inductive elements, and output rectifiers. However, part of a required LED driver circuit dimming can be achieved by frequency variation of the resonant converter to a reliable AM dimming level.

Second, the present invention provides for pulse-width modulation, PWM, of the resonant converter to obtain a desired average output voltage, output current, or output power of the LED driver circuit. The pulse-width modulation frequency is lower than the switching frequency of converter switches. As an example, the switching frequency of the converter switches may be above 10 kHz or above 100 kHz, whereas the pulse-width modulation frequency may be below 3 kHz or below 1 kHz.

A pulse-width modulation of the resonant DC-DC converter may be obtained by switching the converter on and off with a predetermined duty cycle at the pulse-width modulation frequency. This means that during part of the duty cycle the converter switches 10, 11 are both non-conductive, and that during another part of the duty cycle the converter switches 10, 11 are switched at their predetermined switching frequency (which may be variable to obtain AM).

A pulse-width modulation of the resonant DC-DC converter may alternatively or supplementarily be obtained by operating the converter switches at different switching frequencies. This means that during part of the duty cycle the converter switches 10, 11 are switched at a first predetermined switching frequency (at which the resonant circuit provides a high output voltage), and during another part of the duty cycle the converter switches 10, 11 are switched at a second predetermined switching frequency (at which the resonant circuit provides a low output voltage).

Third, in a combination of AM and PWM of the resonant converter, both as described above, a first dimming of the LED driver circuit may be obtained in an AM mode or in a PWM mode, while a further dimming may be obtained by combining the AM and PWM modes. In the combined AM and PWM mode, the PWM mode does not need to provide very short duty cycles while still a deep dimming is obtained. Since very short duty cycles are difficult to control stably (due to only a fraction of the control range being used), the combined AM and PWM mode provides deep dimming with stable control of the PWM duty cycle.

Fourth, dimming is possible as explained in the following. Reference is made to FIG. 1, showing an LED series switch 56, and assuming an LED shunt switch 58 not to be present. Also reference is made to FIG. 2 showing an LED series switch 57. Switching the LED series switches 56, 57 on and off with a predetermined duty cycle will result in a PWM and dimming of the LED unit 52. This pulse-width modulation frequency may be the same as, or different from the converter pulse-width modulation frequency, and is lower than the switching frequency of the converter switches. When the LED series switches 56 and 57 are non-conductive, the LED driver circuit has a high quality factor, Q, due to the absence of a load (LED unit 52). Accordingly, the LED driver circuit has a high voltage gain with a correspondingly high output voltage across output capacitor 50. On the other hand, when the LED series switches 56 and 57 are conductive, the LED driver circuit has a lower Q, a lower voltage gain, and a lower output voltage across output capacitor 50. This change of output voltage when opening and closing the LED series switches 56 and 57 is undesired, since a constant output voltage is needed for constant output current.

A constant output voltage can be reached by increasing the converter frequency with a predetermined amount when the LED series switches 56 and 57 are non-conductive. This can be illustrated by reference to FIG. 5.

Figure 5:
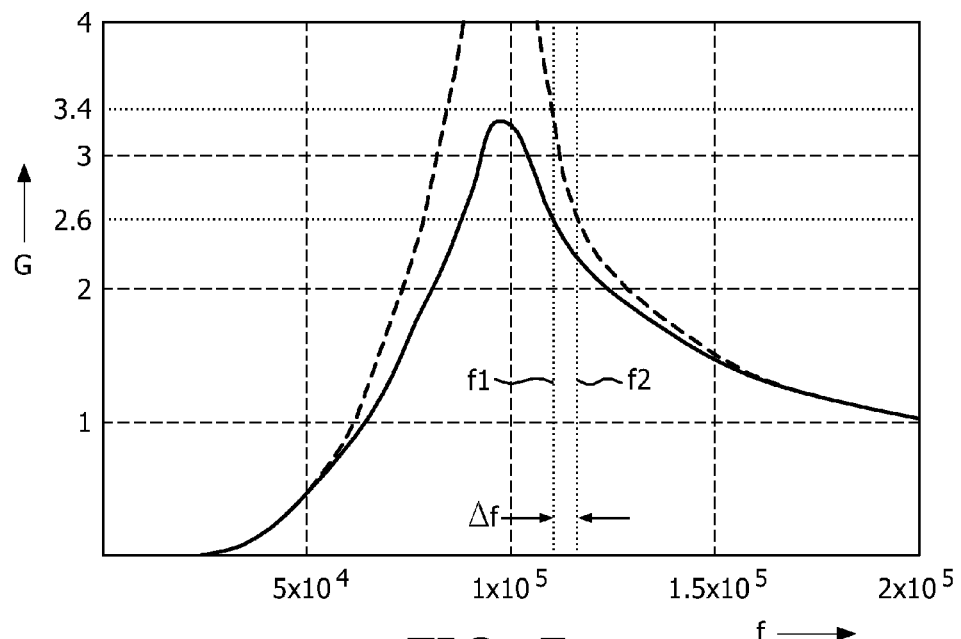
FIG. 5 depicts a voltage gain diagram of a resonant converter of the LED driver circuit of any of FIGS. 1-4.

FIG. 5 shows an exemplary voltage gain diagram of the LLC resonant converter of FIGS. 1 and 2. The horizontal axis shows a frequency f=ω/2·π ranging from 10 kHz to 200 kHz. The vertical axis shows a voltage gain G. The solid line in FIG. 5 represents a voltage gain curve at a predetermined load, e.g. nominal current, while the dashed line in FIG. 5 represents a voltage gain curve at no-load. As can be seen in FIG. 5, at a frequency f1 of 110 kHz a voltage gain G at nominal current is 2.6, while the voltage gain for the unloaded converter at f1=110 kHz is 3.4. This will cause an unwanted high current through the LED unit 52 when the output capacitor 50 is charged at this high voltage gain, when closing the LED series switch 56, 57 again. Accordingly, when the LED series switch 56, 57 is non-conductive, the converter switching frequency needs to be increased by Δf to a frequency f2 to keep the voltage gain at 2.6, the same as at nominal current.

The change in frequency may be induced by e.g. adding a predetermined voltage to the voltage sensed across the sense resistor 54, when this voltage is a parameter for the control circuit 100 controlling the resonant converter switching frequency. The result will be that the voltage across the output capacitor 50 remains constant during PWM operation, so that during PWM the LED current is instantly present during switching the LED series switches 56, 57, which results in accurate steep PWM current pulses. This enables very small duration LED current pulses which are quite suitable for a color LED driver circuit. This limits or eliminates a peak current through an LED unit 52.

Referring to FIG. 1, while the LED series switch 56 is non-conductive, the output capacitor 50 will not be discharged, which further improves the PWM pulse behavior. In the LED driver circuit of FIG. 2, while the LED series switch 57 is non-conductive, the output capacitor 50 will be discharged, but the frequency shift will keep the rectifier output voltage constant.

The required frequency increase value to keep the voltage across the output capacitor constant can be put in a memory of the control unit 100 as a fixed value. Alternatively, the converter voltage gain curve (transfer characteristic) can be put into a memory of the control unit 100 as a table to determine the frequency shift required. Alternatively, the control circuit 100 can be loaded with a look-up table by measuring the output voltage in an unloaded condition of the converter. This may be seen as a calibration.

Referring to FIG. 1, and assuming that the LED shunt switch 58 is present while the LED series switch 56 is permanently conductive (in other words: the LED series switch is replaced with a through connection), the value of the inductor 38 has to be such that the reactive current during the time that the shunt switch 58 is conductive is relatively low. When this is the case, the conduction losses in the converter switches 10, 11 are low. As can be seen in FIG. 1, the output capacitor 50 discharges when the LED shunt switch 58 is conductive. For this reason, use of an LED series switch 56 is more suitable than an LED shunt switch 58.

In the output circuit of FIG. 3, each LED unit 52, 53 shown can be shunted by an LED shunt switch 52a, 53a. Accordingly, in a first time slot, the LED unit 52 may be powered by opening LED shunt switch 52a and closing LED shunt switch 53a. In a second time slot, the LED unit 53 may be powered by closing LED shunt switch 52a and opening LED shunt switch 53a. In a third time slot, the LED units 52 and 53 may be powered by opening both LED shunt switches 52a and 53a. In a fourth time slot, none of the LED units 52, 53 may be powered by closing both LED shunt switches 52a, 53a. The control circuit 100 is able to vary the voltage across the string of LED units 52, 53, so that the required current flows through the LED unit(s) in the different time slots. The same frequency shifting technique during PWM, as explained above, is applicable here to have accurate low duty cycle current pulses.

With the various ways of dimming of the DC-DC resonant converter as described above are applied (AM and PWM dimming), a PWM dimming through a switching of an LED series switch or an LED shunt switch may start at a relative low LED current level. Then, to achieve a required dimming level, the duty cycle of the PWM dimming through a switching of an LED series switch or an LED shunt switch need not become very small to still achieve deep dimming. Relative large time steps may be applied which result in stable deep dimming, thereby avoiding unstabilities and corresponding LED flicker.

During changing the amplitude of the output parameters of the LED driver circuit, extra resonant orders may be introduced in the resonant converter to stretch the output parameters range, as illustrated with reference to FIG. 4.

FIG. 4 shows a series arrangement of a capacitor 62 and a capacitor series switch 60. The series arrangement is coupled in parallel to the primary winding 34 of the transformer 32. Alternatively, the series arrangement can be coupled in parallel to the resonant capacitor 30.

Figure 6:
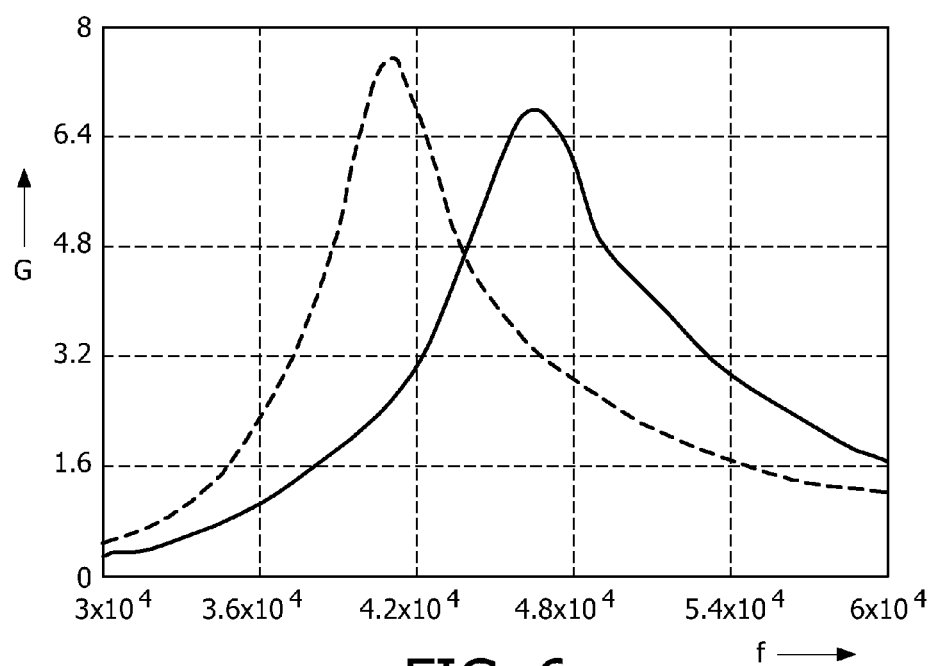
FIG. 6 depicts a voltage gain diagram of a resonant converter of the LED driver circuit of FIG. 4.

By closing and opening the capacitor series switch 60, the resonant circuit and its gain curves are changed. As an example, FIG. 6 shows different curves (one in solid line, and one in dashed line) of gain G versus frequency f, one applying when the capacitor series switch 60 is conductive, and the other one applying when the capacitor series switch 60 is non-conductive. Accordingly, the opening and closing of the capacitor series switch 60 may be used for amplitude modulating the resonant converter and/or for pulse-width modulating the resonant converter. The required frequency range may thus be limited, resulting in a more optimum and efficient design.

Figure 7:
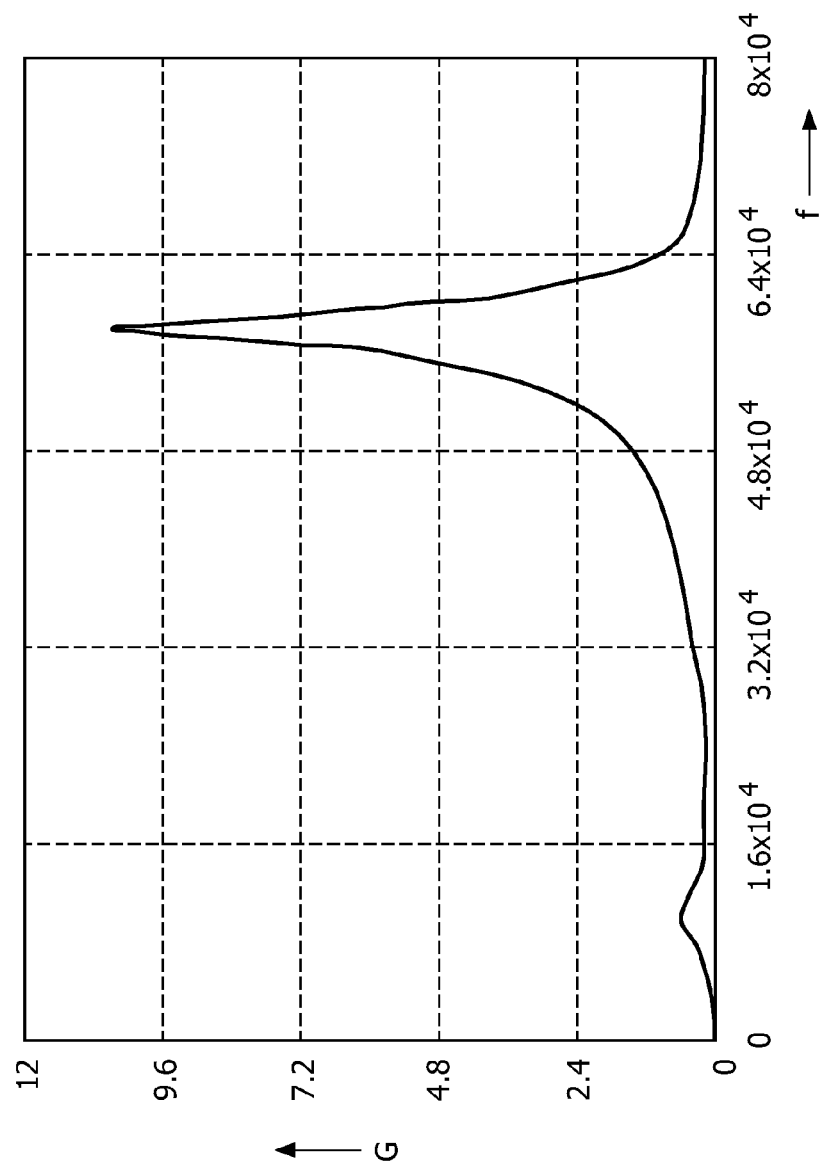
FIG. 7 depicts a voltage gain diagram of a resonant converter of an alternative embodiment of the LED driver circuit of FIG. 4.

When the series arrangement of the capacitor 62 and the capacitor series switch 60 is coupled in parallel to the secondary winding 36 of the transformer, the gain curve becomes steeper when closing the capacitor series switch 60, as illustrated in FIG. 7. Accordingly, the opening and closing of the capacitor series switch 60 may, in such a circuit configuration, be used for amplitude modulating the resonant converter and/or for pulse-width modulating the resonant converter.

As explained above, a dimmable LED driver circuit comprises a resonant DC-DC converter coupled to an output circuit. The converter comprises a half bridge or full bridge switching circuit coupled to a resonant circuit. An output of the resonant circuit is rectified and fed to the output circuit. The output circuit comprises at least one LED series or shunt switch for switching an LED unit on and off. A control circuit controls the switches of the switching circuit at a variable switching frequency. The control circuit is also configured for controlling the switching circuit for amplitude modulating the converter and for pulse-width modulating the converter at a first pulse-width modulation frequency lower than the switching frequency. The control circuit is further configured for controlling the switching of the LED switch at a second pulse-width modulation frequency lower than the switching frequency.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage. The term coupled, as used herein, is defined as connected, although not necessarily directly, and not necessarily mechanically.

A single processor or other unit may fulfill the functions of the control circuit recited in the claims. Alternatively, the control circuit may encompass more than one processor to fulfill its functions.

It is noted that the present invention is applicable to isolated and non-isolated resonant converters. It is also noted that the present invention is applicable to converters with synchronous rectification. It is further noted that the present invention is applicable to half bridge, full bridge and single converter switch resonant converters. It is also noted that the converter can be controlled on voltage, current, power or light sensor input as a parameter for control.

The invention claimed is:

1. A dimmable LED driver circuit comprising:
   a resonant DC-DC converter comprising a switching circuit having at least a first converter switch and a second converter switch, and coupled to a resonant circuit, and a rectifier circuit coupled to the resonant circuit;
   an output circuit coupled to the rectifier circuit, the output circuit comprising LED output terminals arranged to be coupled to an LED unit; and
   a control circuit configured for switching the converter switches at a variable switching frequency, the control circuit further being configured for controlling the switching circuit for amplitude modulating the converter and for pulse-width modulating the converter at a first pulse-width modulation frequency lower than the switching frequency.

2. The dimmable driver circuit of claim 1, wherein the control circuit is configured to vary the switching frequency of the switching circuit for amplitude modulating the converter.

3. The dimmable driver circuit of claim 1, wherein the control circuit is configured to switch the converter on and off for pulse-width modulating the converter at the first pulse-width modulation frequency lower than the switching frequency.

4. The dimmable driver circuit of claim 1, wherein the control circuit is configured to vary the switching frequency of the switching circuit between a first frequency and a second frequency, for pulse-width modulating the converter at the first pulse-width modulation frequency lower than the switching frequency.

5. The dimmable driver circuit of claim 1, wherein the converter comprises a series arrangement of a capacitor and a capacitor series switch, and wherein the control circuit is configured to switch the capacitor series switch for amplitude modulating the converter and for pulse-width modulating the converter at the first pulse-width modulation frequency lower than the switching frequency.

6. The dimmable driver circuit of claim 1, wherein the output circuit comprises a series arrangement of the LED output terminals and an LED series switch, the series arrangement coupled in parallel to an output capacitor, wherein the control circuit is configured to switch the LED series switch at a second pulse-width modulation frequency lower than the switching frequency.

7. The dimmable driver circuit of claim 1, wherein the output circuit comprises a parallel arrangement of the LED output terminals and an output capacitor, the parallel arrangement coupled in series to an LED series switch, wherein the control circuit is configured to switch the LED series switch at a second pulse-width modulation frequency lower than the switching frequency.

8. The dimmable driver circuit of claim 6, wherein the switching frequency of the converter is varied between a first switching frequency and a second switching frequency in synchronism with the opening and closing of the LED series switch.

9. The dimmable driver circuit of claim 1, wherein the output circuit comprises a parallel arrangement of the LED output terminals, an output capacitor, and an LED shunt switch, wherein the control circuit is configured to switch the LED shunt switch at a second pulse-width modulation frequency lower than the switching frequency.

10. A method of controlling a dimmable LED driver circuit, the method comprising:
    providing a resonant DC-DC converter comprising a switching circuit having at least a first converter switch and a second converter switch, and coupled to a resonant circuit, and a rectifier circuit coupled to the resonant circuit;
    providing an output circuit coupled to the rectifier circuit, the output circuit comprising LED output terminals arranged to be coupled to an LED unit;
    switching the converter switches at a variable switching frequency; and
    controlling the switching circuit for amplitude modulating the converter and for pulse-width modulating the converter at a first pulse-width modulation frequency lower than the switching frequency.

11. The dimmable driver circuit of claim 7, wherein the switching frequency of the converter is varied between a first switching frequency and a second switching frequency in synchronism with the opening and closing of the LED series switch.

12. The dimmable driver circuit of claim 11, wherein an output voltage of the resonant DC-DC converter when the switching frequency of the converter is the first switching frequency and the LED series switch is open is the same as the output voltage of the resonant DC-DC converter when the switching frequency is the second switching frequency and the LED series switch is closed.

13. The dimmable driver circuit of claim 8, wherein an output voltage of the resonant DC-DC converter when the switching frequency of the converter is the first switching frequency and the LED series switch is open is the same as the output voltage of the resonant DC-DC converter when the switching frequency is the second switching frequency and the LED series switch is closed.

14. The method of claim 10, further comprising varying the switching frequency of the switching circuit for amplitude modulating the converter.

15. The method of claim 10, further comprising varying the switching frequency of the switching circuit between a first frequency and a second frequency for pulse-width modulating the converter at the first pulse-width modulation frequency lower than the switching frequency.

16. The method of claim 10, wherein the resonant DC-DC converter comprises a series arrangement of a capacitor and a capacitor series switch, and wherein the method further comprises switching the capacitor series switch for amplitude modulating the converter and for pulse-width modulating the resonant DC-DC converter at the first pulse-width modulation frequency lower than the switching frequency.

17. The method of claim 10, wherein the output circuit comprises a series arrangement of the LED output terminals and an LED series switch, the series arrangement coupled in parallel to an output capacitor, wherein the control circuit is configured to switch the LED series switch at a second pulse-width modulation frequency which is less than the switching frequency.

18. The method of claim 17, wherein the switching frequency of the resonant DC-DC converter is varied between a first switching frequency and a second switching frequency in synchronism with the opening and closing of the LED series switch.

19. The method of claim 10, wherein the output circuit comprises a parallel arrangement of the LED output terminals and an output capacitor, the parallel arrangement coupled in series to an LED series switch, wherein the control circuit is configured to switch the LED series switch at a second pulse-width modulation frequency lower than the switching frequency.

20. The method of claim 19, wherein the switching frequency of the resonant DC-DC converter is varied between a first switching frequency and a second switching frequency in synchronism with the opening and closing of the LED series switch.

* * * * *